United States Patent
Boehman et al.

(10) Patent No.: US 12,516,661 B2
(45) Date of Patent: Jan. 6, 2026

(54) DESMODROMIC MECHANISM AND FLUID PUMP

(71) Applicants: The Regents of the University of Michigan, Ann Arbor, MI (US); Philip Dingle Consulting, LLC., Rochester, MI (US)

(72) Inventors: André Louis Boehman, Ann Arbor, MI (US); Philip John Gregory Dingle, Rochester, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 18/516,878

(22) Filed: Nov. 21, 2023

(65) Prior Publication Data
US 2024/0167462 A1    May 23, 2024

Related U.S. Application Data

(60) Provisional application No. 63/426,833, filed on Nov. 21, 2022.

(51) Int. Cl.
*F04B 1/0426* (2020.01)
*F02M 37/04* (2006.01)
(Continued)

(52) U.S. Cl.
CPC ......... *F04B 1/0426* (2013.01); *F02M 37/043* (2013.01); *F04B 9/042* (2013.01); *F02M 59/06* (2013.01)

(58) Field of Classification Search
CPC ........ F04B 9/042; F04B 9/045; F04B 1/0426; F02M 37/043; F02M 37/06; F02M 59/06; F02M 59/02; F01L 1/30
(Continued)

(56) References Cited

U.S. PATENT DOCUMENTS 1,676,114 A * 7/1928 Rusdell ................ F04B 53/125
  74/56
2,894,459 A * 7/1959 Mcduffie ............ F04B 43/0045
  92/48

(Continued)

FOREIGN PATENT DOCUMENTS

DE  102009000949 A1 * 8/2010 ............. F02M 59/06
FR        74009 E * 3/1961
(Continued)

OTHER PUBLICATIONS

International Search Report corresponding to application PCT/US2023/080822, dated Mar. 28, 2024, 3 pages.
(Continued)

*Primary Examiner* — Thomas Fink
(74) *Attorney, Agent, or Firm* — Reising Ethington P.C.

(57) ABSTRACT

A desmodromic mechanism exhibits reciprocating motion of a pair of cam followers driven by a single cam. The mechanism is useful in a fuel pump that pressurizes a liquid for delivery to a fuel rail of a combustion engine. A desmodromic lever is symmetric about its rotational axis and maintains continuous contact between cam lobes and cam followers for the entirety of each rotational cycle. The mechanism is particularly useful in multi-piston pumps required to deliver higher than normal volumes of liquid fuel, as is the case with low energy density alternatives to diesel fuel.

20 Claims, 2 Drawing Sheets

(51) Int. Cl.
*F04B 9/04* (2006.01)
*F02M 59/06* (2006.01)

(58) Field of Classification Search
USPC .......................................... 74/47, 22 A, 569
See application file for complete search history.

(56) References Cited

U.S. PATENT DOCUMENTS

| | | | | |
|---|---|---|---|---|
| 3,043,228 | A * | 7/1962 | Bennett | F04B 1/0408 |
| | | | | D15/7 |
| 3,433,172 | A * | 3/1969 | Sola | F04B 9/042 |
| | | | | 92/116 |
| 3,738,180 | A * | 6/1973 | Sola | F02M 59/102 |
| | | | | 74/53 |
| 4,348,917 | A | 9/1982 | Gardner et al. | |
| 4,387,672 | A * | 6/1983 | Crocker | F02B 41/04 |
| | | | | 123/55.3 |
| 4,535,641 | A * | 8/1985 | Kriz | F02M 59/102 |
| | | | | 74/53 |
| 4,803,889 | A | 2/1989 | Harris | |
| 5,279,209 | A * | 1/1994 | Mayne | F01B 1/062 |
| | | | | 123/197.1 |
| 5,884,608 | A * | 3/1999 | Cooke | F04B 49/08 |
| | | | | 123/495 |
| 6,347,610 | B1 * | 2/2002 | Norton | F01B 9/06 |
| | | | | 123/197.4 |
| 7,552,707 | B2 * | 6/2009 | Fisher | F04B 27/02 |
| | | | | 123/48 B |
| 9,382,839 | B2 * | 7/2016 | Bonner | F02B 75/048 |
| 10,408,201 | B2 * | 9/2019 | Smith | F04B 25/00 |
| 2002/0166525 | A1 | 11/2002 | Folino | |
| 2015/0211509 | A1* | 7/2015 | Gledhill, III | F04B 43/026 |
| | | | | 417/413.1 |

FOREIGN PATENT DOCUMENTS

GB 2424455 B * 12/2008 .................. F01B 9/06
WO WO-2023012688 A1 * 2/2023 ............. F04B 1/0426

OTHER PUBLICATIONS

Written Opinion corresponding to application PCT/US2023/080822, dated Mar. 28, 2024, 6 pages.

* cited by examiner

DESMODROMIC MECHANISM AND FLUID PUMP

TECHNICAL FIELD

The present disclosure relates generally to devices that convert continuous rotary motion to reciprocating motion and, more specifically, to reciprocating motion fluid pumps.

BACKGROUND

Reciprocating pumps are commonly used for the displacement and pressurizing of fluids. Such pumps may include a piston that moves back and forth in a cylinder under the action of a rotating cam, with the cam pushing the piston in one direction against the bias of a return spring that pushes the piston in the opposite direction. A desmodromic mechanism uses a second cam instead of a return spring to push the piston in the opposite direction from the first cam. U.S. Pat. No. 4,535,641 to Kriz et al. discloses a pump that employs a desmodromic mechanism. Operation of the Kriz pump is problematic, however, because the particular arrangement, in which the cam follower is constrained to linear movement while the distal end of the desmodromic lever exhibits arcuate movement, causes the clearance between the lever end and the cam follower to be non-constant during each stroke. This can cause excessive noise and wear of the mechanism over time. The Kriz pump is also not conducive to a multi-piston design.

SUMMARY

In accordance with various embodiments, a desmodromic mechanism is configured with reciprocating motion of a pair of cam followers driven by a single cam.

In various embodiments, the cam is a multi-lobe cam.

In various embodiments, the reciprocating motion of each cam follower is out of phase with the reciprocating motion of the other cam follower.

In various embodiments, each cam follower is on a rising flank of the cam when the other cam follower is on a falling flank of the cam. The rising flank may have a profile complimentary to a profile of the falling flank such that both cam followers are in continuous contact with the cam.

In various embodiments, each cam follower is at a maximum distance from a rotational axis of the cam when the other cam follower is at a minimum distance from the rotational axis of the cam.

In various embodiments, translation axes of the respective cam followers are perpendicular.

In various embodiments, translation axes of the respective cam followers form an angle of 60°, 135°, or 108°.

In various embodiments, the mechanism includes a lever that drives each cam follower in a radial direction in response to motion of the other cam follower in an opposite radial direction. A rotational axis of the lever may be angularly centered between a reciprocating axis of each cam follower, and the lever may be symmetric about a rotational axis of the lever. A rotational axis of the lever may be adjustable with respect to a rotational axis of the cam, and each cam follower may include a slot with the lever extending through each slot. An interface where the lever contacts the cam follower may be a sliding interface.

In accordance with various embodiments, a fluid pump includes a desmodromic mechanism in which reciprocating motion of a pair of cam followers is driven by a single cam. The fluid pump includes a pair of pistons. A pumping stroke of each piston is driven by one of the cam followers, and a filling stroke of each piston is driven by a desmodromic lever.

In various embodiments, the desmodromic lever is driven by one of the cam followers during the pumping stroke of the respective piston.

In various embodiments, the fluid pump is a fuel pump. Each piston draws a liquid engine fuel into a respective cylinder of the pump during a filling stroke and pressurizes a fuel rail of a combustion engine with the liquid engine fuel during a pumping stroke.

In accordance with various embodiments, a fluid pump is configured such that a filling stroke of one piston is driven by a pumping stroke of another piston via a desmodromic lever.

In various embodiments, the fuel pump is configured to receive, displace, and pressurize a liquid fuel for a combustion engine.

It is contemplated that any one or more of the above-listed features, the features in the following description, and/or the features in the appended drawings can be combined in any technically feasible combination to define a claimed invention.

DESCRIPTION OF EMBODIMENTS

Described below is a desmodromic mechanism that exhibits reciprocating motion of a pair of cam followers driven by a single cam. The mechanism is useful in a fluid pump that pressurizes a liquid for delivery to an external device requiring the fluid, such as a fuel rail of a combustion engine. A lever of the mechanism can be arranged to maintain continuous contact between a cam lobe and cam follower for the entirety of each rotational cycle. The mechanism is particularly useful in multi-piston pumps required to deliver higher than normal volumes of liquid fuel, as is the case with low energy density alternatives to diesel fuel, for example.

Figure 1:
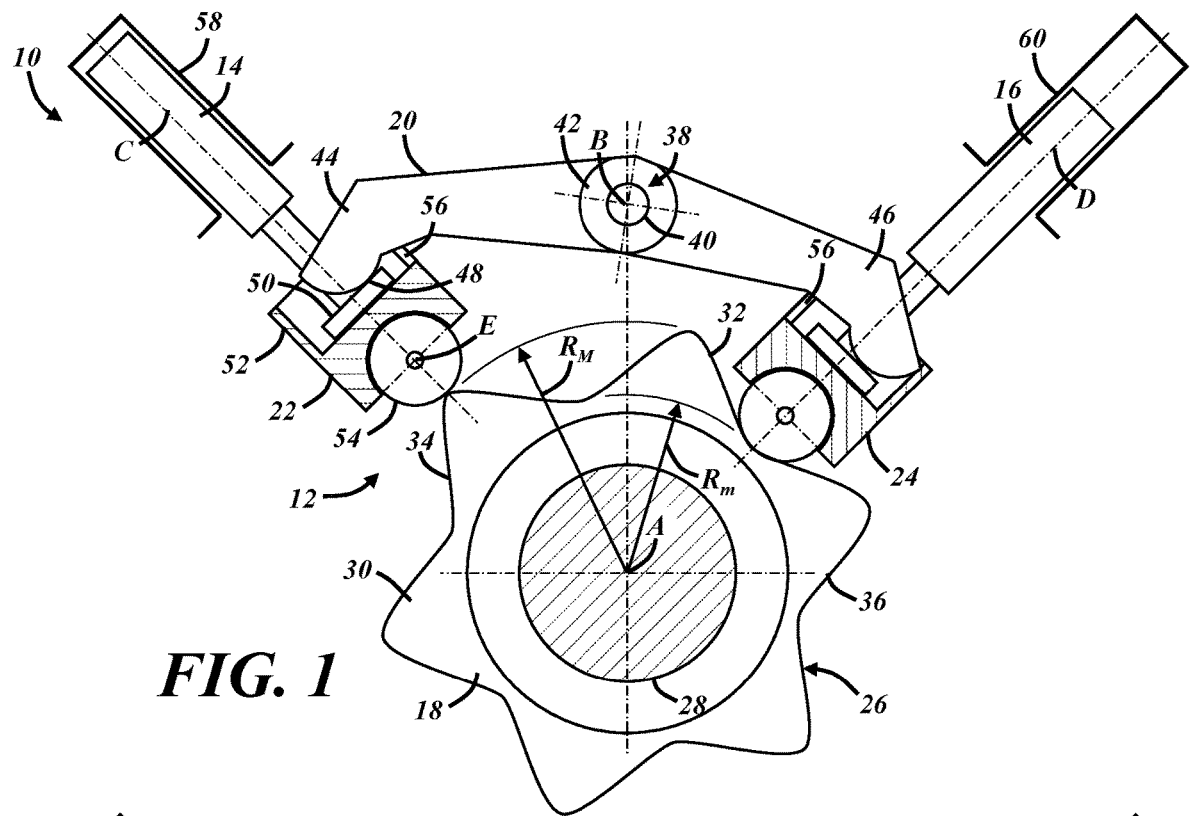
FIG. 1 is a partial cross-sectional view of an illustrative desmodromic mechanism with a first cam follower at a top position and a second cam follower at a bottom position.

With reference to FIG. 1, an embodiment of a fluid pump 10 includes a desmodromic mechanism 12 that governs the reciprocating motion of a pair of pistons or plungers of the pump, including a first piston 14 and a second piston 16. As used herein, a "desmodromic mechanism" is a mechanism in which a mechanical element is actively moved between different first and second positions with respect to a reference point—that is, the mechanical element is moved from the first position to the second position via a force applied by one part of the mechanism, and from the second position to the first position via a force applied by a different part of the mechanism. While illustrated and described below in the context of a fluid pump 10, such as a liquid fuel pump for use with a combustion engine, the desmodromic mechanism 12 is useful with other machines or systems requiring reciprocating motion, such as combustion engine valve trains.

The illustrated desmodromic mechanism 12 includes a cam 18 that rotates about a cam axis (A), a desmodromic lever 20, and a pair of tappets or cam followers, including a first cam follower 22 and a second cam follower 24. Each cam follower 22, 24 is actively moved between different first and second positions with respect to a rotational axis (A) of the cam 18. In FIG. 1, the first cam follower 22 is illustrated at a first or top position, which is at a maximum radial distance $R_M$ from the cam axis (A), and the second cam follower 24 is illustrated at a second or bottom position, which is at a minimum radial distance $R_m$ from the cam axis. During operation of the desmodromic mechanism 12, each cam follower 22, 24 is repeatedly moved outward from its bottom position to its top position via a force applied by the cam 18, and inward from its top position to its bottom position via a force applied by the lever 20, as described further below.

A cam shaft 26 provides the cam 18 mounted on a shaft 28 for rotation with the shaft about the cam axis (A). The shaft 28 may be mounted to a housing (not shown) of the pump 10 such that the cam axis (A) is at a fixed position relative to the housing. Rotational motion of the cam shaft 26 may be provided by an electric motor or other suitable actuator. For example, the cam shaft 26 may be actuated by another rotating component (e.g., a gear or chain) of a combustion engine with which the pump 10 is used. Where driven by an electric motor, the shaft 28 may be the motor shaft or may be coupled to the motor shaft via a linkage or other transmission element.

The illustrated cam 18 is a multi-lobe cam having six lobes 30 equally spaced about the cam axis (A). Each lobe 30 extends radially outward from a diameter defined by the distance $R_m$ to a diameter defined by the distance $R_M$, and each lobe extends 60° circumferentially about the cam axis (A). Each lobe 30 has a rising flank 32 and a falling flank 34, depending on the direction of rotation of the cam 18. The rising flank 32 is the portion of each lobe 30 in contact with each cam follower 22, 24 during movement from the bottom position to the top position, and the falling flank 34 is the portion of each lobe in contact with each cam follower during movement from the top position to the bottom position. In the illustrated view, the cam 18 is configured to rotate clockwise.

Together, the plurality of lobes 30 defines a cam profile 36, which is the shape of the perimetrically outer surface of the cam 18 along which the cam followers 22, 24 move when the cam is rotating. The cam profile 36 of the illustrated example is configured so that, when the first cam follower 22 is at its top position as in FIG. 1, the second cam follower 24 is at its bottom position, and vice versa. Similarly, when one of the cam followers 22, 24 is moving from its top position to its bottom position during an intake or filling stroke, the other cam follower is moving from its bottom position to its top position during an exhaust or pumping stroke. During a single rotation of the illustrated cam 18, each cam follower 22, 24 moves between its top position and its bottom position six times. The cam 18 may have a different number of lobes in other implementations.

While the cam 18 functions to move each cam follower 22, 24 from its bottom position to its top position by applying a radially outward force to the respective cam follower, the desmodromic lever 20 functions to move each cam follower from its top position to its bottom position by applying a radially inward force to the respective cam follower. The illustrated lever 20 is mounted to the pump housing or other stationary pump component via a pivot joint 38 for rotation about a lever axis (B). The pivot joint 38 may for example include a post 40 and a bearing 42 having an inner race pressed on the post and an outer race rigidly attached within a bore of the lever 20.

In some embodiments, the position of the lever axis (B) with respect to the pump housing or the cam axis (A) is adjustable, such as by an eccentric mechanism. Such adjustability permits fine tuning of the position of the lever 20 with respect to the cam followers 22, 24 to ensure that each cam follower remains in contact with the cam 18 along all 360° of the cam profile 36. An eccentric mechanism may include, for example, set screws that enable adjustment of the position of the bearing 42 within a larger bore of the lever 20.

The lever 20 has opposite first and second ends 44, 46 spaced from the lever axis (B) in different radial directions. Each end 44, 46 of the lever 20 includes a bearing surface 48 in contact with a respective bearing surface 50 at a contact interface. In the illustrated example, each bearing surface 50 is provided by a plunger foot, spaced from the working end of the respective piston 14, 16 by a piston shaft along first and second translation axes (C, D). Each plunger foot is captured between one of the cam followers 22, 24 and one of the ends 44, 46 of the lever 20. The ends 44, 46 of the lever 20 may be forked to provide clearance for the piston shaft. In operation, the lever 20 rocks back and forth about the lever axis (B) and is driven by one of the cam followers 22, 24 during movement from its bottom position to its top position, thereby driving movement of the other cam follower toward its bottom position, as described further below. Movement of the bearing surfaces 48 of the lever 20 is arcuate about the lever axis (B), and movement of the bearing surfaces 50 is translational along the translation axes (C. D), making the interface between the opposing bearing surfaces a sliding interface.

Each illustrated cam follower 22, 24 includes a body 52 and a contact element 54 carried by the body 52. Each body 52 is coupled with and moves together in translation with the actuated element. In this case, the actuated elements are the pistons 14, 16, which are coupled with the cam follower bodies 52 at the plunger foot comprising the bearing surface 50. It is also possible for the body 52 to provide the bearing surface 50. The bearing surface 50 is in continuous contact with the lever 20, and the contact element 54 is in continuous contact with the cam 18. A slot 56 is formed through a sidewall of each body 52 facing the lever axis (B) to provide access to the bearing surface 50 by the lever 20. The slot may extend through the opposite sidewall of the body 52 in some cases. The slots 56 also provide an additional constraint on movement of the cam followers 22, 24 by preventing rotation of the cam followers about the translation axes (C. D). In this example, each contact element 54 is a roller pivotably attached to the body 52 for rotation about a roller axis (E). Each cam follower 22, 24, including its body 52, contact element 54, and roller axis (E) moves together with the respective piston 14, 16 and bearing surface 50 in translation along the respective first and second translation axes (C, D).

Each translation axis (C. D) is defined by a cylinder bore 58, 60 of the pump 10 within which the respective pistons 14, 16 undergo their reciprocating motions. The pistons 14, 16 and cylinder bores 58, 60 are illustrated schematically here for simplicity. Skilled artisans will understand that each piston/bore pair may be associated with one or more seals defining the instantaneous cylinder volume, a fluid inlet configured to communicate fluid into the cylinder bore from outside the cylinder bore via an inlet valve, and a fluid outlet configured to communicate fluid from the cylinder bore to outside the cylinder bore via an outlet valve.

Figure 2:
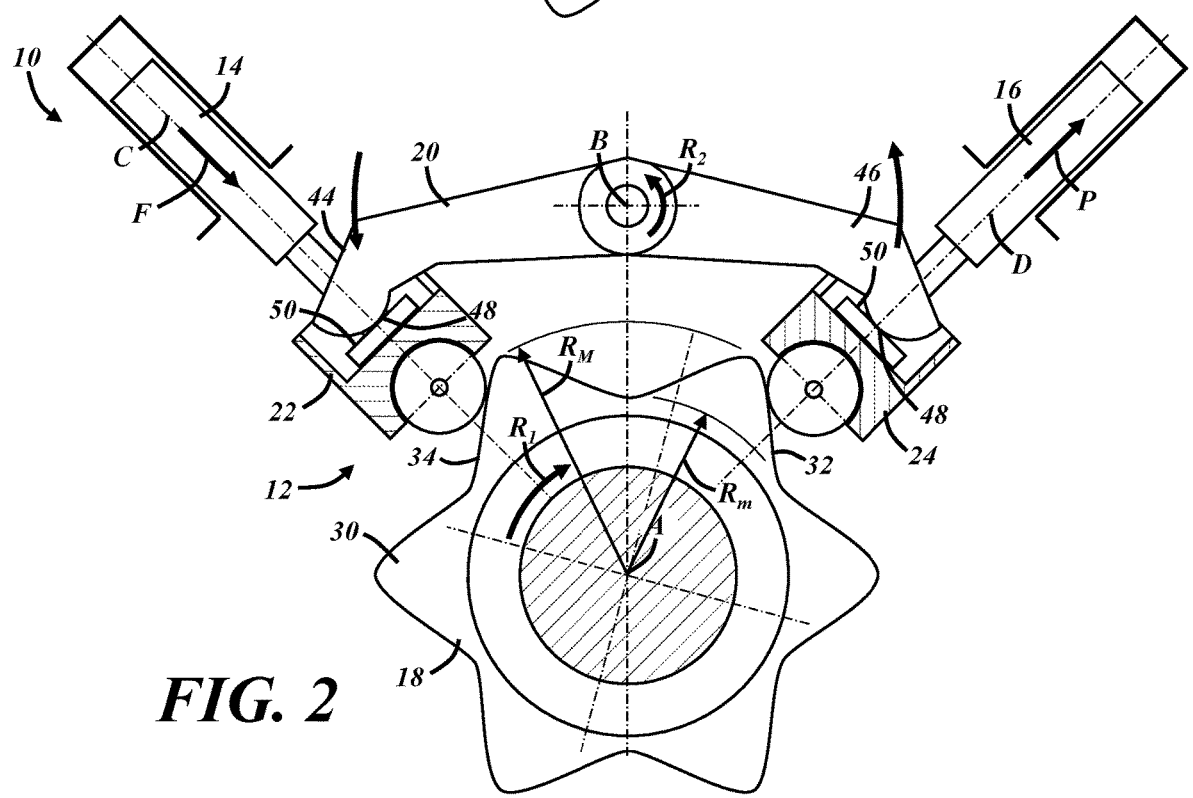
FIG. 2 illustrates the desmodromic mechanism of FIG. 1 with the first cam follower on a falling flank of a cam lobe and the second cam follower on a rising flank of a cam lobe.

FIGS. 1-4 illustrate an operating sequence of the various elements of the pump 10 of FIG. 1. In FIG. 1, the first piston 14 is at its top position, while the second piston 16 is at its bottom position. FIG. 2 illustrates the pump 10 of FIG. 1 after the cam 18 has been rotated from its orientation of FIG. 1 in a first rotational direction $R_1$ (clockwise in the figures) by 15° about the cam axis (A). By this rotation, the second cam follower 24 is driven outward along the second translation axis (D) away from its bottom position and toward its top position with the second cam follower located along the rising flank 32 of one of the lobes 30. The driving force in the direction of the translation axis (D) is the radial component of the resultant force applied to the cam follower 24 by the cam 18.

This outward translation of the second cam follower 24 along the translation axis (D) causes the lever 20 to pivot from its orientation of FIG. 1 in a second rotational direction $R_2$ (counter-clockwise in the figures), which is opposite the first rotational direction $R_1$, about the lever axis (B). In particular, the second cam follower 24 applies an outward force in the direction of the second translation axis (D) to the second end 46 of the lever 20 at the interface between their opposing bearing surfaces 48, 50, resulting in an applied torque and rotation of the lever 20 about the lever axis (B).

Rotation of the lever 20 in the second rotational direction $R_2$ about the lever axis (B) causes the first cam follower 22 to be driven inward along the first translation axis (C) away from its top position and toward its bottom position such that the first cam follower 22 is located along the falling flank 34 of one of the lobes 30. In particular, the first end 44 of the lever 20 applies an inward force in the direction of the first translation axis (C) to the first cam follower 22 at the interface between their opposing bearing surfaces 48, 50, resulting in translation of the first cam follower along the translation axis (C).

The desmodromic lever 20 thus ensures that the first cam follower 22 remains in contact with the cam 18 during rotation of the cam 18 from the orientation of FIG. 1 to the orientation of FIG. 2. In this case, the lever 20 operates to drive the first piston 14 along the first portion of a filling stroke (F) while the cam 18 is simultaneously operating to drive the second piston 16 along the first portion of a pumping stroke (P).

In this example, the falling flank 34 along which the first cam follower 22 is located is part of a different lobe 30 than the rising flank 32 along which the second cam follower 24 is simultaneously located. In some embodiments, each of the cam followers 22, 24 is simultaneously located along opposite flanks 32, 34 of the same lobe 30.

Figure 3:
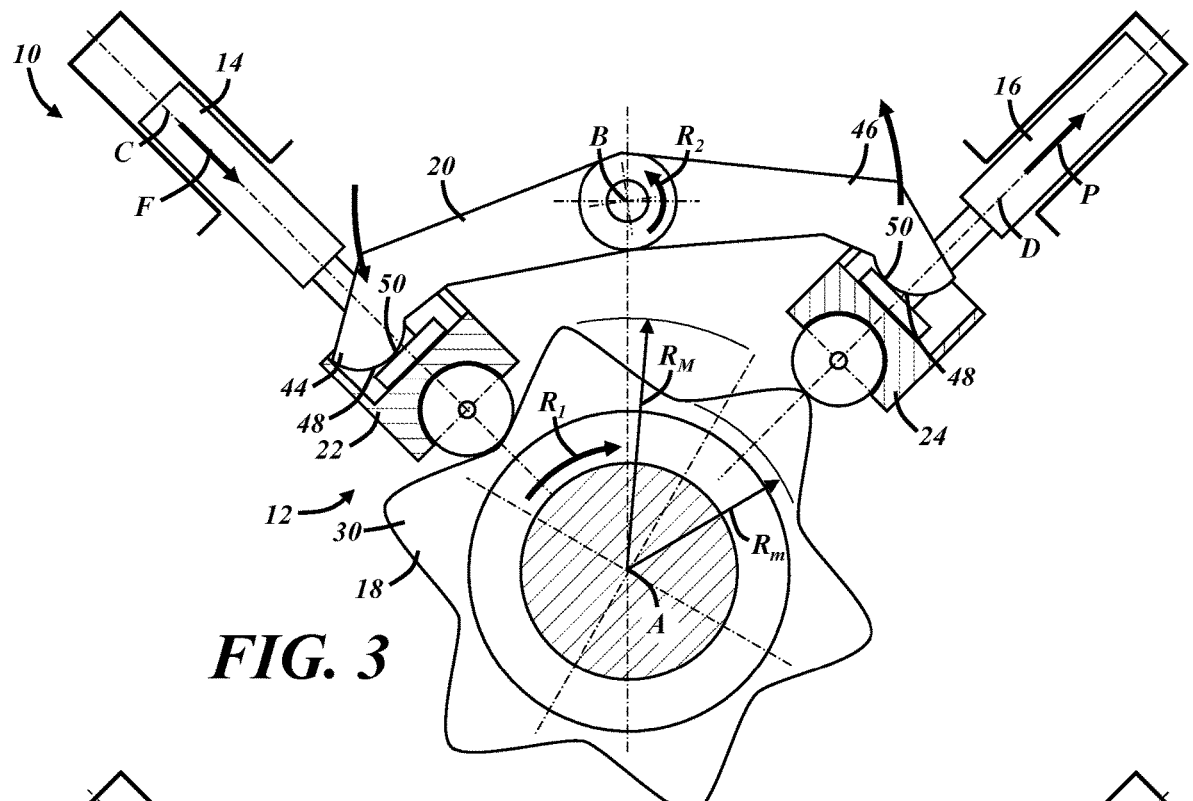
FIG. 3 illustrates the desmodromic mechanism of FIGS. 1 and 2 with the first cam follower at the bottom position and the second cam follower at the top position.

FIG. 3 illustrates the pump 10 of FIGS. 1 and 2 after the cam 18 has been rotated in the first rotational direction $R_1$ by another 15° about the cam axis (A) relative to its orientation in FIG. 2 (30° relative to its orientation in FIG. 1). By this rotation, the second cam follower 24 is driven further outward along the second translation axis (D) to its top position at the end of its pumping stroke (P). This outward translation of the second cam follower 24 causes the lever 20 to pivot farther in the second rotational direction $R_2$ about the lever axis (B). This further rotation of the lever 20 about the lever axis (B) causes the first cam follower 22 to be driven inward along the first translation axis (C) to its bottom position at the end of its filling stroke (F). Here again, the desmodromic lever 20 ensures that the first cam follower 22 remains in contact with the cam 18 during the rotation of the cam 18 from the orientation of FIG. 2 to the orientation of FIG. 3.

Figure 4:
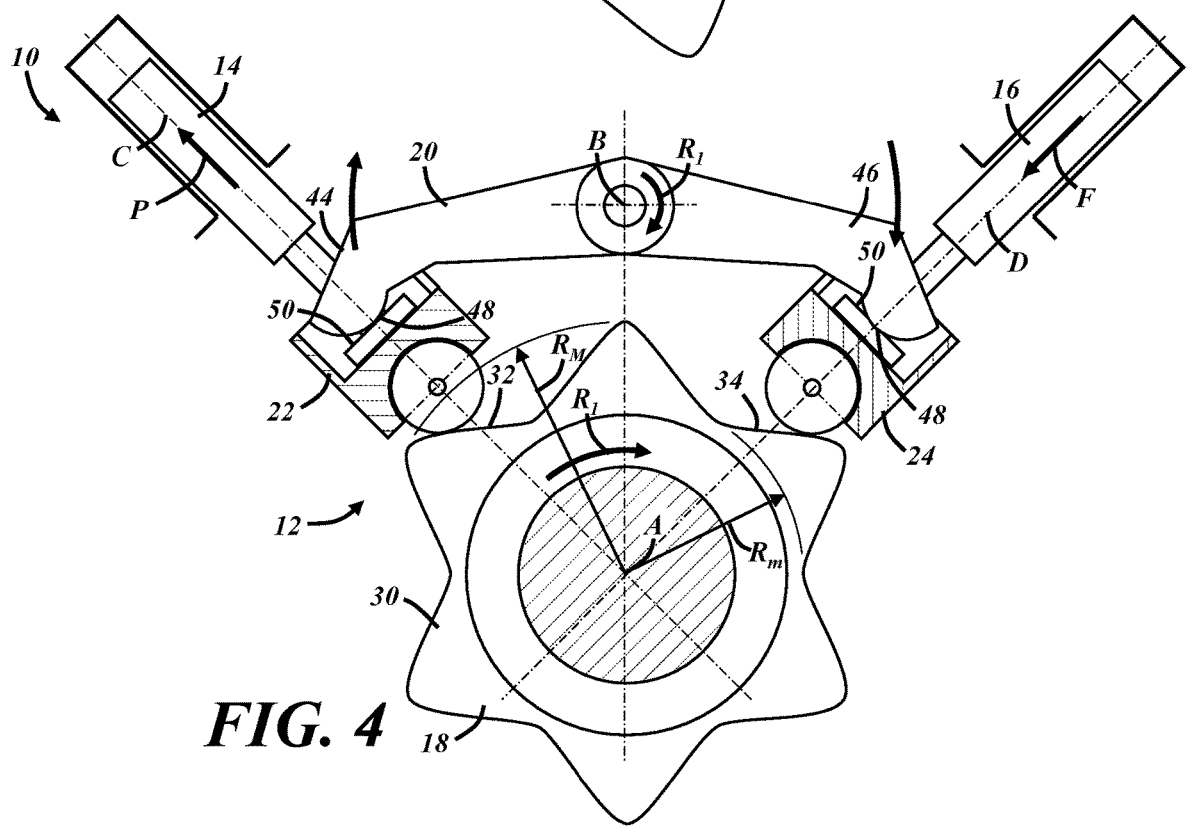
FIG. 4 illustrates the desmodromic mechanism of FIGS. 1-3 with the first cam follower on a rising flank of a cam lobe and the second cam follower on a falling flank of a cam lobe.

FIG. 4 illustrates the pump 10 of FIGS. 1-3 after the cam 18 has been rotated in the first rotational direction $R_1$ by an additional 15° about the cam axis (A) relative to its orientation in FIG. 3 (45° relative to its orientation in FIG. 1). By this rotation, the first cam follower 22 is driven outward along the first translation axis (C), away from its bottom position and toward its top position such that the first cam follower 22 is located along the rising flank 32 of one of the lobes 30.

Outward translation of the first cam follower 22 along the translation axis (C) causes the lever 20 to pivot in the first rotational direction $R_1$ (clockwise in the figures) about the lever axis (B) relative to its orientation in FIG. 3. In particular, the first cam follower 22 applies an outward force in the direction of the first translation axis (C) to the first end 44 of the lever 20 at the interface between their opposing bearing surfaces 48, 50, resulting in an applied torque and rotation of the lever about the lever axis (B).

This rotation of the lever 20 about the lever axis (B) causes the second cam follower 24 to be driven inward along the second translation axis (D), away from its top position and toward its bottom position such that the second cam follower 24 is located along the falling flank 34 of one of the lobes 30. In particular, the second end 46 of the lever 20 applies an inward force in the direction of the second translation axis (D) to the second cam follower 24 at the interface between their opposing bearing surfaces 48, 50, resulting in translation of the second cam follower along the translation axis (E).

Here again, the desmodromic lever 20 ensures the cam follower 24 on the falling flank 34 of a cam lobe remains in contact with the cam 18 during the rotation of the cam 18 from the orientation of FIG. 3 to the orientation of FIG. 4. The radial position of each cam follower 22, 24 with respect to the cam axis (A) in FIG. 4 is the same as in FIG. 2. But, in FIG. 4, the lever 20 operates to drive the second piston 16 along the first portion of its filling stroke while the cam 18 is simultaneously operating to drive the first piston 14 along the first portion of its pumping stroke.

An additional 15° of rotation of the cam 18 about the cam axis (A) relative to its orientation in FIG. 4 results in the same cam and cam follower positions as in FIG. 1, except the first cam follower 22 is between a different pair of lobes and the second cam follower 24 is on a different lobe than in FIG. 1. In other words, with an additional 15° of cam rotation relative to FIG. 4, the first cam follower 22 is driven outward along the first translation axis (C) to its top position, the lever 20 is driven by the first cam follower 22 to pivot in the first rotational direction $R_1$ about the lever axis (B), and the second cam follower 24 is driven by the lever 20 inward along the second translation axis (D) to its bottom, during which time the desmodromic lever 20 ensures the second cam follower 24 remains in contact with the cam 18, with the lever 20 operating to drive the second piston 16 to the end of its filling stroke (F) while the cam 18 is simultaneously operating to drive the first piston 14 to the end of its pumping stroke (P).

In the example of FIGS. 1-4, the reciprocating motion of two different cam followers 22, 24 is driven by a single cam 18 having a single cam profile 36. The desmodromic mechanism 12 can be configured to move one cam follower in one direction (e.g., a pumping stroke or valve-open stroke) while simultaneously moving another cam follower in an opposite direction (e.g., a filling stroke or valve-close stroke, all with a single cam. The cam 18 drives each cam follower 22, 24 along the rising flank 32 of a cam lobe 30 while the desmodromic lever 20 drives each cam follower 22, 24 along the falling flank 34 of the same or a different cam lobe. Viewed differently, while one cam lobe 30 is directly driving one of the cam followers toward its top position, the same cam lobe is indirectly driving the other cam follower toward its bottom position via the desmodromic lever 20.

In the example in the figures, the reciprocating movement of each cam follower 22, 24 along its respective axis (C, D) is effectively 180° out of phase with the other cam follower. In other words, if translational movement of each cam follower 22, 24 is plotted with respect to rotational position of the cam 18, one curve is the reciprocal of the other, with one cam follower always moving in the opposite direction from the other with respect to the cam axis (A) or being at a different extremity ($R_M$, $R_m$) than the other. This effective phase difference is by virtue of the angular spacing between cam lobes 30, between the translation axes (C, D) of the cam followers 22, 24, and the relative angular spacing of the lever axis (B).

Here, there are six cam lobes 30 angularly spaced from each other by 60° (center-to-center) and two cam followers 22, 24 whose respective axes (C, D) are perpendicular—i.e., angularly spaced by 90°—and intersect at the cam axis (A). The peak-to-valley angular spacing of the cam profile 36 is thus 30°, and the inverse movement effect can be achieved with the translation axes (C, D) forming an angle of 30°, 90°, or 150°. The single cam 18 of FIGS. 1-4 could provide reciprocating movement for two pairs of cam followers (four total) or for three pairs of cam followers (six total) with an equal number of synchronized phases and inverse movement phases. The effect may be achieved in part by symmetry in the illustrated example, where the lever 20 is symmetric about the lever axis (B), the lever axis (B) is angularly centered between the translation axes (D, E) of the cam followers 22, 24, and each lobe 30 is symmetric about its peak. While symmetry is not necessarily required, the rising flank 32 and the falling flank should have complimentary profiles such that both cam followers 22, 24 are in continuous contact with the cam 18.

In other examples, the cam 18 may be a two-lobe cam (e.g., elliptical) driving a pair of cam followers along translation axes angularly spaced by 90°, a three-lobe cam driving a pair of cam followers along translation axes angularly spaced by 60° or 180°, a four-lobe cam driving a pair of cam followers along translation axes angularly spaced by 45° or 135°, or a five-lobe cam driving a pair of cam followers along translation axes angularly spaced by 36°, 108°, or 180°. There is no per se limit on the number of lobes or the number of cam followers other than practical packaging and manufacturing limitations. There is also no in-phase or 180° out-of-phase requirement. To name one example, the illustrated six-lobe cam 18 could drive three pairs of cam followers, where the two cam followers of each pair are angularly spaced from each other by 90° and each pair of two cam followers are angularly spaced from each other by 75°. The possibilities are many.

In some embodiments, the fluid pump 10 is a fuel pump configured to receive, displace, and pressurize a liquid fuel for a combustion engine. The fuel pump may operate to draw the liquid fuel into a cylinder 58, 60 from a fuel source during the filling stroke of the respective piston 14, 16 and to pressurize a fuel rail of a combustion engine with the liquid fuel during the pumping stroke.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A desmodromic mechanism wherein reciprocating motion of a pair of cam followers is driven by a single cam and a desmodromic lever, each cam follower being in continuous contact with the cam,
    wherein a rising flank of the cam moves one of the cam followers radially outward while the desmodromic lever simultaneously moves the other of the cam followers radially inward to maintain contact with a falling flank of the cam, and
    wherein an interface where the lever contacts the cam follower is a sliding interface.

2. The mechanism of claim 1, wherein the cam is a multi-lobe cam.

3. The mechanism of claim 1, wherein the reciprocating motion of each cam follower is out of phase with the reciprocating motion of the other cam follower.

4. The mechanism of claim 1, wherein each cam follower is at a maximum distance from a rotational axis of the cam when the other cam follower is at a minimum distance from the rotational axis of the cam.

5. The mechanism of claim 1, wherein translation axes of the respective cam followers are perpendicular.

6. The mechanism of claim 1, wherein translation axes of the respective cam followers form an angle of 60°.

7. The mechanism of claim 1, wherein the lever drives each cam follower in a radial direction in response to motion of the other cam follower in an opposite radial direction.

8. The mechanism of claim 1, wherein a rotational axis of the lever is angularly centered between a reciprocating axis of each cam follower.

9. The mechanism of claim 1, wherein the lever is symmetric about a rotational axis of the lever.

10. The mechanism of claim 1, wherein a rotational axis of the lever is adjustable with respect to a rotational axis of the cam.

11. The mechanism of claim 1, wherein each cam follower comprises a slot and the lever extends through each slot.

12. A fluid pump comprising the mechanism of claim 1, the fluid pump comprising a pair of pistons, wherein a pumping stroke of each piston is driven by said rising flank and a filling stroke of each piston is driven by the desmodromic lever.

13. The fluid pump of claim 12, wherein the desmodromic lever is driven by said rising flank during the pumping stroke of the respective piston.

14. A fuel pump for a combustion engine, the fuel pump comprising the fluid pump of claim 12, wherein each piston is configured to draw a liquid engine fuel into a respective cylinder of the pump during the filling stroke and pressurize a combustion engine fuel rail with the liquid engine fuel during the pumping stroke.

15. The mechanism of claim 1, wherein translation axes of the respective cam followers form an angle of 135°.

16. The mechanism of claim 1, wherein translation axes of the respective cam followers form an angle of 108°.

17. A desmodromic mechanism wherein reciprocating motion of a pair of cam followers is driven by a single cam and translation axes of the respective cam followers form an angle of 60°, 135°, or 108°.

18. The mechanism of claim 17, wherein an interface where the lever contacts the cam follower is a sliding interface.

19. A desmodromic mechanism wherein reciprocating motion of a pair of cam followers is driven by a single cam and a desmodromic lever, each cam follower being in continuous contact with the cam,
   wherein a rising flank of the cam moves one of the cam followers radially outward while the desmodromic lever simultaneously moves the other of the cam followers radially inward to maintain contact with a falling flank of the cam, and
   wherein translation axes of the respective cam followers are perpendicular.

20. A fuel pump comprising the mechanism of claim 19, the fuel pump comprising a pair of pistons, wherein a pumping stroke of each piston is driven by said rising flank and a filling stroke of each piston is driven by the desmodromic lever, and wherein each piston is configured to draw a liquid engine fuel into a respective cylinder of the pump during the filling stroke and pressurize a combustion engine fuel rail with the liquid engine fuel during the pumping stroke.

\* \* \* \* \*